United States Patent [19]

Mee

[11] 4,039,144
[45] Aug. 2, 1977

[54] ENVIRONMENTAL CONTROL METHOD AND APPARATUS

[75] Inventor: Thomas R. Mee, Altadena, Calif.

[73] Assignee: Mee Industries, Inc., San Gabriel, Calif.

[21] Appl. No.: 419,895

[22] Filed: Nov. 28, 1973

Related U.S. Application Data

[63] Continuation-in-part of Ser. No. 230,680, March 1, 1972, abandoned, which is a continuation-in-part of Ser. No. 103,170, Dec. 31, 1970, Pat. No. 3,788,542.

[51] Int. Cl.$^2$ .................................... A01G 15/00
[52] U.S. Cl. .................................... 239/2 R; 239/14
[58] Field of Search .................. 239/2 S, 2 R, 3, 8, 239/11, 14, 102, 200, 185, 225, 512, 519, 521, 522, 524, 542, 587, 590.3, 601; 252/359 R, 359 A

[56] References Cited

U.S. PATENT DOCUMENTS 3,584,412  6/1971  Palmer .......................... 239/318

FOREIGN PATENT DOCUMENTS 14,309   5/1924  Australia ........................ 239/200
812,123  8/1951  Germany ........................ 239/200

*Primary Examiner*—John J. Love
*Attorney, Agent, or Firm*—Christie, Parker & Hale

[57] ABSTRACT

Control of the temperature and humidity of an environment is obtained by injecting a large volume of water droplets into the air with a major portion of the water droplets being in the range of from about 5 to 50 microns in diameter and with an average diameter in the range of from about 10 to 30 microns. When temperatures are low a fog of water droplets essentially opaque to infrared is provided as a cover to crops for preventing frost damage. Crop protection may be poor in borders of fields where cold air drifts in from surrounding areas. Accordingly, fog generators are placed 25 feet or more above the surface to take advantage of temperature inversions. A water curtain may also be used with large drops of warm water falling from a height of about 15 feet to heat and humidify air drifting into the foggy region.

Fog having droplets in the above-mentioned size range is produced by impacting a stream of water having a diameter in the range of from about 125 to 400 microns at a velocity in excess of about 135 feet per second against a smooth, solid surface. A nozzle having an orifice in the range of from about 125 to 400 micron diameter and operated at a pressure in excess of about 350 psi is used to create a water jet for impact on the surface. A complete system involves a large plurality of such nozzles supplied with water substantially free of particles having a size larger than about 1/10 the diameter of the orifice, and at a height in excess of about 25 feet above the surface so that a continuous line of fog is generated in a temperature inversion. The quantity of water added is preferably in excess of about 15 grams per meter of a continuous line along the edge of the area to be protected per second.

18 Claims, 8 Drawing Figures

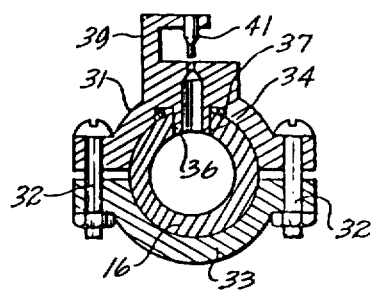
FIG_1
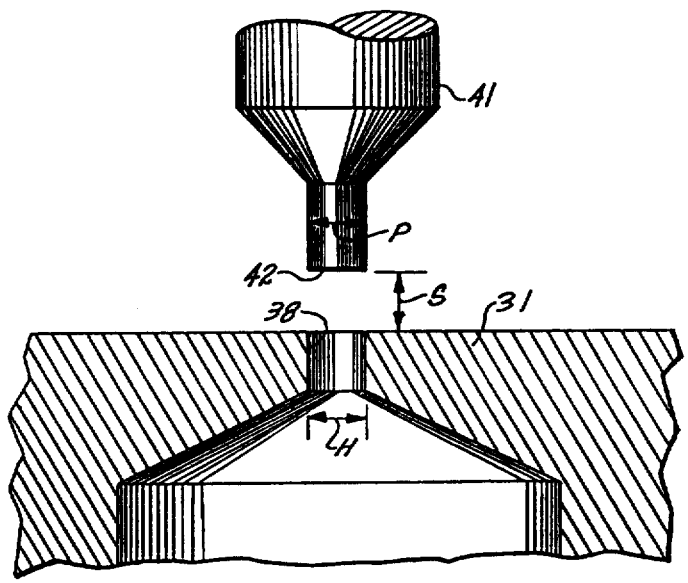
FIG_2
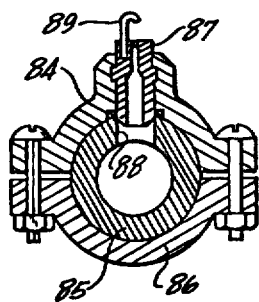
FIG_3

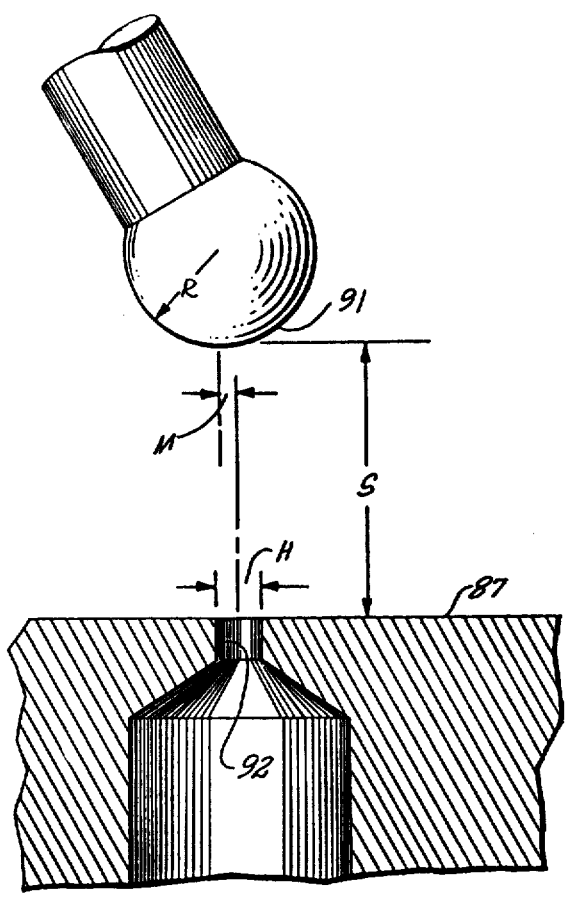
FIG_4
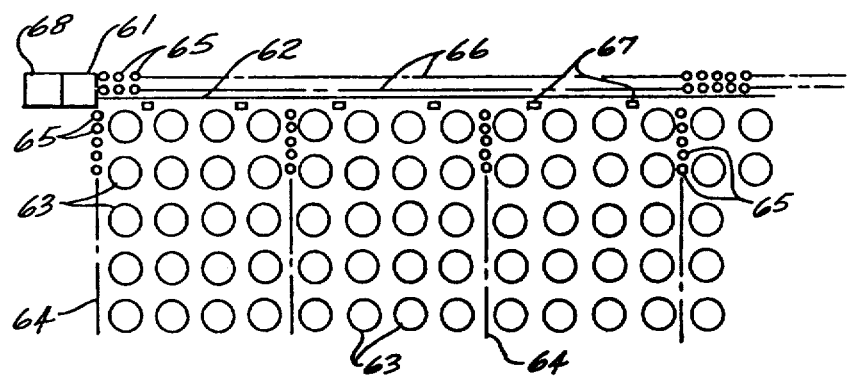
FIG_5

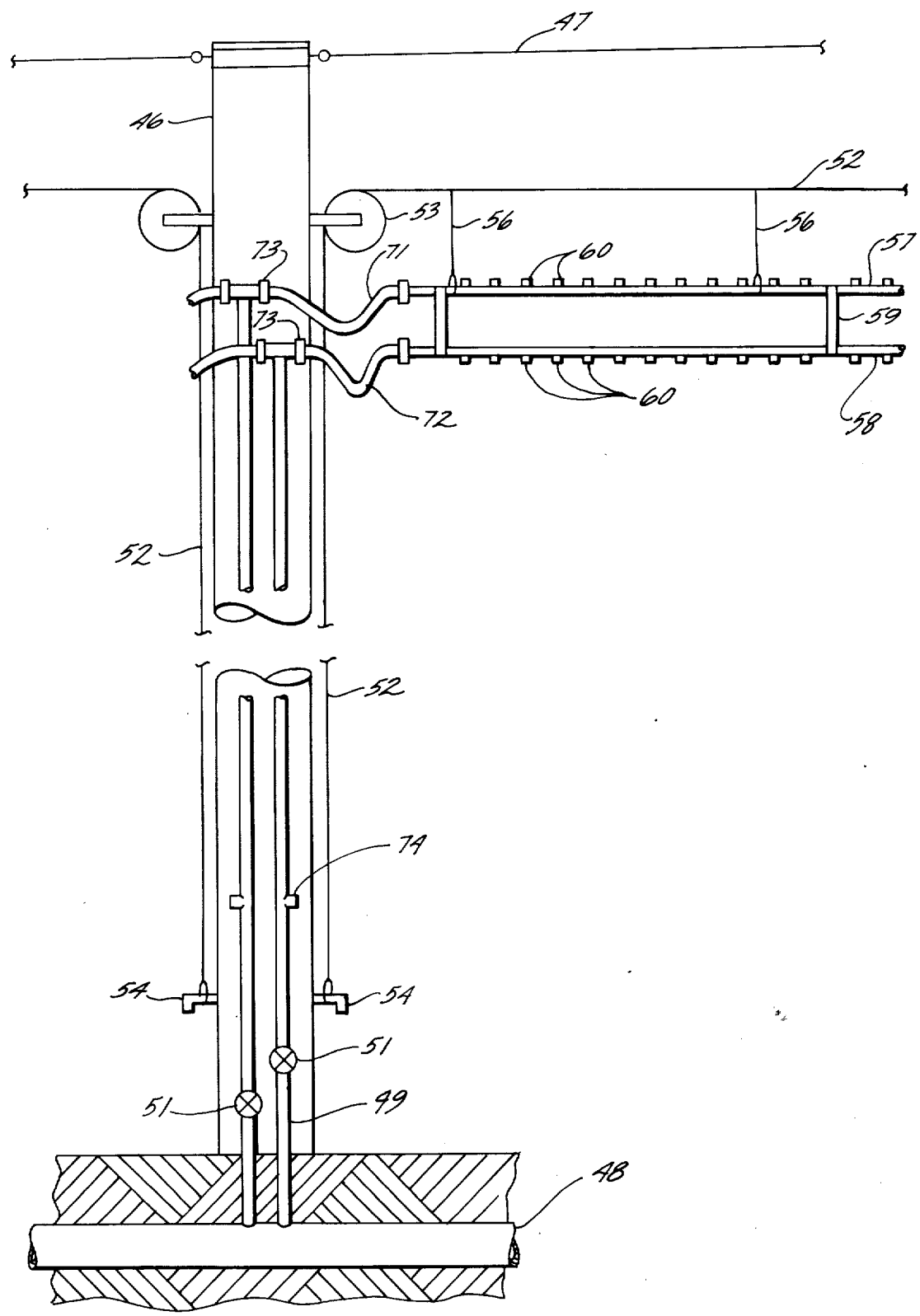

ENVIRONMENTAL CONTROL METHOD AND APPARATUS

BACKGROUND

This is a continuation-in-part of my copending application Ser. No. 230,680 filed Mar. 1, 1972, entitled ENVIRONMENTAL CONTROL METHOD AND APPARATUS, now abandoned; which is a continuation-in-part of my copending application, Ser. No. 103,170 filed Dec. 31, 1970, entitled ENVIRONMENTAL CONTROL METNHOD AND APPARATUS now U.S. Pat. No. 3,788,542.

It has been recognized that in order to provide protection to crops against frost damage that a blanket of dispersed material opaque to infrared radiation is effective. Cooling of crops in low temperatures occurs most rapidly when the air is clear and the heat stored in the crops and soil is radiated into space at a high rate. It has long been recognized that fog, or clouds or the like inhibit free radiation of infrared from the soil and crops and thereby inhibit frost damage.

It is, therefore, desirable to provide a means for producing a large amount of water droplets having a size range suitable for scattering infrared radiation for protecting crops against frost damage. The system should provide droplets small enough that the fall velocity is low and the droplets do not, in general, fall to the surfaces in the region where the environment is being controlled. Preferably, the means is operated with low energy requirements for minimized operating cost. Since frost protection may be provided in a limited area, means are needed for protecting the borders of foggy region from intrusion of cold air.

BRIEF SUMMARY OF THE INVENTION

Therefore, in practice of this invention according to a presently preferred embodiment there is provided method and apparatus for protection of crops from frost damage wherein water droplets of a size equivalent to natural fog are injected into a volume of air at a height in excess of about 25 feet above the surface along a border of the region to be protected so that the temperature of the resultant mixture of fog droplets and saturated air is at a higher temperature than air nearer ground level.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates one embodiment of fog producing nozzle used in practice of this invention;

FIG. 2 is an enlarged detail of the nozzle of FIG. 1;

FIG. 3 illustrates in transverse cross section another embodiment of nozzle constructed according to principles of this invention;

FIG. 4 is an enlarged detail of a portion of the nozzle of FIG. 3;

FIG. 5 illustrates in plan view an orchard protected from frost damage in practice of this invention;

FIG. 8 illustrates an arrangement for suspending pipes high above ground level.

DESCRIPTION

Figure 6:
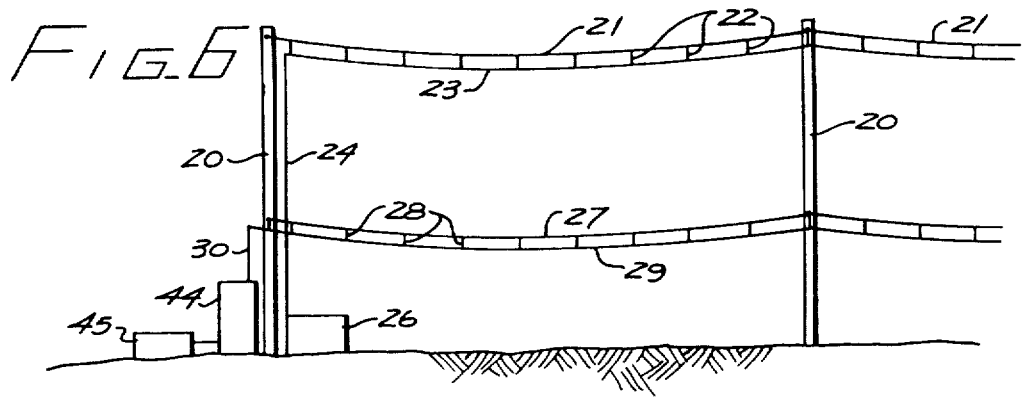
FIG. 6 illustrates semi-schematically a combined fog generating and water curtain system for frost protection.

In order to obtain optimum fog for frost protection, the droplet size of the water should be small so that fog droplets remain suspended and inhibit loss of heat by radiation. If droplets fall to ground level they are not available for such protection. If droplets are larger than about 50 microns in diameter their fall velocity is sufficiently high that a substantial proportion of the droplets may reach the ground and stable fog is not obtained.

It is preferred that the droplet size be small to obtain optimum backscattering of infrared radiation which accounts for most heat loss. It is found, however, that in order to decrease the droplet size much below about 5 microns the energy requirements become excessive since the curvature of the droplet surfaces is high and high surface energies are involved. It is, therefore, preferred in practice of this invention to inject water droplets into the environment wherein a major portion of the droplets have diameters in the range of from about 5 to 50 microns. If the diameter of a large portion of droplets is appreciably less than about 5 microns the energy required to produce the droplets is uneconomically high, and if the droplets are larger than about 50 microns the fall velocity is too high for effective environmental control.

In producing a fog of droplets not all of the droplets have the same diameter, and a range of diameters is actually obtained. It is found to be important that the average diameter of the droplets in the fog be in the range of from about 10 to 30 microns, that is, for example, when the fog has an average droplet diameter of 15 microns, approximately half of the droplets have diameters smaller than 15 microns and approximately half have diameters larger than 15 microns. In a fog having such a size distribution of droplets as provided in practice of this invention, it is found that the mass median diameter is about 30 microns, that is, half of the mass of water in the fog is in droplets having diameters larger than about 30 microns and half of the mass is in droplets having diameters less than about 30 microns.

When the average droplet diameter is less than about 10 microns, the energy requirements for forming the droplets are excessively high because of the high surface energy of the highly curved small droplets. It is, therefore, important that the major portion of droplets have diameters in excess of about 5 microns, and that the average droplet diameter be greater than about 10 microns. The average droplet diameter should also be less than about 30 microns, and the major portion of droplets have diameters less than about 50 microns. When the average diameter exceeds about 30 microns, backscattering efficiency for a given amount of water drops off and more water is used than is needed. The larger diameter droplets also have a higher fall velocity and these two factors can in many circumstances result in undue settling of fogs produced.

Since it has been found that fog having the above identified size characteristics is important for frost protection means are provided in practice of this invention for producing such a fog and providing for its controlled distribution in a region for optimum frost protection.

FIG. 1 illustrates in transverse cross section an embodiment of fog producing nozzle suitable for practice of this invention and capable of producing a major portion of droplets in the size range of from about 5 to 50 microns and having an average droplet diameter in the range of from 10 to 30 microns. As illustrated in this embodiment, the fog nozzle 17 is in the general form of a saddle tee having a plastic body 31 capable of withstanding an internal pressure of at least 350 psi and preferably in excess of about 500 psi since it is found that pressures in this range are important in practice of the invention. The plastic body 31 is secured to a pipe 16 by a pair of bolts 32 and a U-shaped bracket 33 on the opposite side of the pipe from the body. A small internal tubular extension 34 on the body is inserted in a hole 36 drilled through the side of the plastic pipe. The body is sealed to the pipe by an O-ring 37 around the extension 34.

A small orifice 38, better seen in the enlarged view of FIG. 2 is provided between the interior of the body 31 and the exterior. The length of the small orifice 38 is not extremely critical but it should be short enough that fluid friction is not excessive and should be longer than a mere knife edge, which as a practical matter would not be obtained without special processing. The diameter H of the orifice is, however, of importance, and should be in the range of from about 125 to 400 microns so that a stream of water passing through the orifice has a diameter in this range.

If the orifice has a diameter less than about 125 microns, several disadvantages accrue. Such a small orifice is particularly susceptible to plugging due to small particles, corrosion products or the like, and orifices larger than this are less susceptible to plugging. A smaller orifice is also much more difficult and expensive to form. Most particularly, however, the quantity of water that can be forced through the orifice at reasonable pressures when it is less than about 125 microns is quite small and an excessive number of nozzles would be required in order to obtain a practical total volume of water from a system. Thus, if the orifices are less than about 125 microns in diameter, the nozzles are more expensive to make and a considerably increased number of them are required. Additionally, when the orifice size is reduced below about 125 microns, the droplets formed by the nozzle are somewhat smaller and hence have a greater surface energy, thereby increasing the energy requirements to properly operate the nozzle. Thus, for numerous reasons, it is found that a minimum orifice diameter of about 125 microns is critical.

The maximum practical diameter of the orifice is about 400 microns, although this limit has not been determined with precision. It is known that an orifice having a diameter of about 200 microns is eminently satisfactory at water pressures in excess of 350 psi, and that an orifice having a diameter of 500 microns is not satisfactory at pressures as high as 1,000 psi. The larger diameter orifice results in a substantial number of droplets in the resultant fog having diameters greater than about 50 microns and these are beyond the preferred range described hereinabove.

The purpose of the orifice 38 is to obtain a high velocity stream of water having a diameter in the range of from about 125 to 400 microns. It is important that this stream of water have a velocity in excess of about 135 feet per second in order to produce fog droplets, a major portion of which are in the size range of from about 5 to 50 microns and which have an average diameter in the range of from about 10 to 30 microns. In order to achieve this high velocity in the small diameter stream, a pressure in excess of about 350 psi is required in the system, and preferably the pressures are in the range of about 350 to 500 psi. Higher pressures can be employed; however, the energy requirements for obtaining the high pressures are high and the slightly increased flow rate of water throgh the orifice does not justify the additional expense in the installation and operating costs.

In order to break the high velocity stream of water into droplets in the range of 5 to 50 microns, the stream is impacted against a smooth, solid surface that serves to spread the stream. In the embodiment illustrated in FIGS. 1 and 2, an L-shaped arm 39 extending upwardly from the body 31 hooks over and supports a cylindrical pin 41 directly over the orifice 38. The pin 41 has a smooth, flat end surface 42 substantially normal to the axis of the orifice 38. The end surface 42 has a diameter P substantially identical with the diameter H of the orifice 38, that is, in the range of from about 125 to 400 microns. It is quite important that the flat surface 42 be carefully aligned with the orifice 38 so that the offset between the center of the surface and the axis of the orifice is less than about 15 microns. This close alignment is required so that the high velocity water stream is certain to impact the flat surface squarely so that very little, if any, of the stream can pass the surface without hitting or being deflected by it. If any significant quantity of the stream does pass the surface without impact, relatively large droplets are obtained outside the preferred range.

It might be supposed that criticality of alignment of the pin with the orifice could be minimized by employing a pin significantly larger in diameter than the orifice. A small enlargement can in fact be tolerated; however, as the diameter of the flat end of the pin is increased, the direction of spreading of water from the nozzle becomes flatter rather than a cone shape, thereby increasing the probability of the resultant fog droplets striking surrounding surfaces or interacting with droplets produced by adjacent nozzles. Larger diameters also tend to make the shape of the edge of the pin more critical since an irregularity in this edge may disrupt the uniform flow of water and cause a portion of the fog to have relatively large droplets outside the preferred range.

Concomitant with the requirement of close axial alignment of the end surface of the pin with the orifice is the requirement that the spacing S between the flat surface 42 and the orifice 38 be about the same as the diameters of the orifice and pin. This requirement arises from the fact that a high velocity stream of water such as emerges from the orifice tends to oscillate laterally at a frequency and amplitude depending on the size and velocity of the stream and the physical properties of the water. By maintaining the spacing S approximately the same as the diameter of the stream of water, the inherent oscillations do not cause the stream to deviate sufficiently that any significant fraction of the stream fails to impact or be deflected by the flat surface 42.

When the high velocity water stream squarely impacts the surface 42 it is spread radially and travels outwardly a short distance as a continually thinning cone-shaped sheet. This radiating cone-shaped sheet of water also becomes thinner and oscillates as it travels radially, and in a short distance the oscillation builds to a point that the sheet breaks into a plurality of radiating filaments or tiny cylinders of water traveling at high velocity. These high velocity filaments in turn oscillate and in a short distance break up into a large number of individual droplets.

The diameter of the filaments formed as the sheet of water oscillates is dependent on the velocity of the water and also the thickness of the sheet. If the orifice diameter is too large, the thickness of the sheet is so great that the filaments formed upon breaking up of the sheet are too large to form droplets, the major portion of which are in the range of from about 5 to 50 microns and which have an average diameter in the range of from about 10 to 30 microns. Likewise, if the velocity of the stream of water is too low, the surface tension or surface energy properties of the water tend to pull the sheet together, i.e., make a steeper cone, or even cause the sheet of water to converge rather than diverge, and again the filaments formed are too large to break into droplets having a major portion in the range of from 5 to 50 microns. Thus, it is important that the water stream impacting on the solid surface be sufficiently small and sufficiently fast to obtain the preferred range of droplet sizes.

It will be apparent, of course, that this also explains the need for maintaining the position of the flat surface in line with the orifice, and maintaifing the spacing S within the indicated limits. If the stream has a substantial portion that fails to be deflected by the solid surface, that portion of the sheet of water formed may be excessively thick to form small enough filaments. Likewise, by failing to impact the surface, the water is not spread into a sufficiently thin sheet and that portion of the sheet may not radiate from the pin at a sufficient velocity to break into proper size filaments to obtain droplets smaller than 50 microns.

A particularly preferred embodiment of nozzle constructed in the manner illustrated in FIG. 2 has an orifice diameter H, a pin diameter P, and a spacing S therebetween, all of about 250 microns. This embodiment is particularly preferred since it provides reliable operation, droplets of nearly optimum size, and is economical to manufacture and operate. When such a nozzle is operated at a pressure in excess of 350 psi it produces water droplets having an average diameter of about 15 microns, a major portion of which are in a size range of from about 10 to 50 microns. Droplets so produced produce a fog of particular utility when the relative humidity is high. This size range is near optimum for maximum backscattering of infrared radiation which is important for frost protection. A nozzle constructed with these dimensions can be made without exorbitant manufacturing costs, and the volume of water that can be passed through the orifice is sufficiently large that only a moderate number of such nozzles are required in most systems.

If the aforementioned nozzle dimensions are increased substantially above about 250 microns, the water droplet diameters are increased, thereby reducing the rate of evaporation and the backscattering efficiency for infrared. If the orifice diameter and other related dimensions are decreased substantially below about 250 microns, the manufacturing costs increase at a substantial rate, and so do the number of nozzles required in a system in order to achieve a selected total quantity of water injected into the environment. Thus, it is found that a nozzle having an orifice diameter, pin diameter, and spacing each of about 250 microns is highly advantageous for environmental control purposes.

It will be recognized that the size of droplets obtained is a function of stream diameter and velocity and also the surface properties of the water. Therefore, some reduction in the velocity or increase in size may be obtained by adding a small quantity of surfactant to the water in order to reduce the surface energy, and it should be understood that such modification is within the scope of practice of this invention. It is preferred, however, that "pure" water be employed without addition of surfactant for a variety of reasons, not the least of which is the difficulty of adding surfactant with precision in the small quantities required in a continuous flow system such as employed in practice of this invention.

FIG. 3 illustrates in transverse cross section another embodiment of fog producing nozzle constructed according to principles of this invention. As illustrated in this embodiment, the nozzle is also in the form of a saddle tee having a body 84 capable of withstanding internal pressure in the range of from at least 350 to 500 psi clamped to a pipe 85 by a U-shaped bracket 86. A hollow metal plug 87 is molded in the plastic body 84 and aligned with a hole 88 through the side of the pipe 85. Staked into the metal plug 87 is a hook-shaped pin 89 having a spherical end 91 (best seen in FIG. 4) over an orifice 92 in the plug 87.

As in the embodiment hereinabove described and illustrated in FIG. 2, the orifice 92 has a diameter H in the range of from about 125 to 400 microns so that when water at a pressure in excess of 350 psi is provided within the plug 87 a water jet having the diameter of the orifice is ejected at a velocity in excess of 135 feet per second. The spherical end 91 of the pin 89 is positioned before the aperture and spaced apart therefrom by a distance S, and in this embodiment having a curved solid surface 91 against which the water stream can impact, it is found that the distance S is less critical and can be several millimeters, for example.

The radius of curvature R of the spherical end 91 of the pin is preferably in the order of about 500 microns and can be in the range of from about 250 to 1500 microns without significantly degrading performance of the fog producing nozzle. The center of curvature of the end 91 is also deliberately offset from the axis of the orifice 92 by an amount M rather than being directly in line therewith. The direction of offset of the end of the pin from the axis of the orifice is towards the portion of the hook-shaped pin 89 (FIG. 3) interconnecting the tip and the plug 87. The optimum amount of offset M is readily determined empirically for a selected pin and orifice size to obtain the desired fogging pattern.

When a pin, either rounded as illustrated in FIG. 4 or flat as illustrated in FIG. 2, is exactly centered on the orifice the resultant conical sheet of water and hence array of fog droplets is substantially uniform in all directions radially from the pin. Because of the mechanical interconnection between the pin and the body in which the orifice is provided there is typically a small arc adjacent the orifice where a mechanical obstruction to radial flow of fog is present. Fog droplets striking the supporting post adhere to it and accumulate to form larger drops that fall from the fogging nozzle. In one embodiment of such nozzle having a flat pin, it is found that a little more than 10% of the water passing through the orifice strikes the supporting post and drips from the region of the nozzle. This amount of water represents an inefficiency in the fogging system and is preferably avoided.

By deliberately offsetting the center of curvature of the surface 91 from the axis of the orifice 92, the distribution of water in the fog produced is skewed to one side, and when the spacing M is properly selected empirically an arc of about 30° centered in the direction of the offset is substantially free of any fog. Since the offset is in the direction of the supporting post, very litte of the fog produced by the nozzle actually impacts against the post and is therefore free to be injected into the surrounding environment. This results in a very high efficiency in the fogging nozzle with substantially all water available for evaporation into the environment.

It is found that, although quite convenient for manufacturing purposes, it is not necessary that a spherical surface be employed in the offset arrangement such as provided in FIG. 4. It is found that a smooth, solid surface having compound convexity in differing degrees can be employed. By compound convexity is meant that the surface is convex in and near the region of impact of the water stream in any plane containing the axis of the stream of water. Thus, the stream impacts on a smooth surface that curves away from the region of impact in all directions.

In the embodiment illustrated in FIG. 2, the flat end surface of the pin is substantially normal to the axis of the orifice through which the water jet is ejected. This results in a substantially uniform radial distribution of fog droplets around the pin. It might be supposed that tilting of the plane surface of the end of a flat pin would direct the fog droplets produced to one side. This is, in fact, the case, and some nonuniformity of fog droplet distribution can be obtained in this manner; however, a significant side effect is obtained that degrades performance more than impact of a portion of the droplets on the supporting pin. As a flat surface is tilted relative to the axis of the water jet, a substantial portion of the water forms in a pair of streams ejected towards each side and of sufficiently large size that droplets much larger than the desired range are produced. Thus, for example, if a flat surface is tilted at the proper angle (depending on the jet velocity and diameter), a spray of droplets covering an angle of about 180° can be obtained, and about half of the water passing through the orifice appears as a fog in this region. At the same time, however, a pair of heavier streams flow laterally from the pin and break up into large droplets that fall inefficiently without forming fog or substantial evaporation.

It is found that a flat surface skewed away from normal to the axis of the orifice by more than a small amount tends to produce droplets in which a significant portion are larger than about 50 microns and, therefore, for most applications such an arrangement is impractical. Similarly, if the flat surface is significantly larger than the stream of water impacting thereon, the tendency of the water to wet and adhere to the flat surface apparently slows the radial velocity enough that a significant portion of the droplets have diameters in excess of about 50 microns. The effect of the edge of the flat surface becomes important when it is enlarged and, further, the spray of fog is flattened. Apparently with a compound curved surface wherein the radius of curvature is in the order of about 500 microns, the radiating sheet of water separates from the surface quickly rather than travelling any substantial distance along the surface and the velocity is not significantly reduced.

The use of a compound curved surface in front of the orifice substantially relaxes the requirement for close spacing between the surface and the orifice, and this is apparently due to the significantly larger acceptable size of the compound curved surface as compared with the flat surface so that the location of impact of the water stream on the surface is much less critical. The inherent oscillation of the water stream over the distance S between the orifice and the pin will not vary the location of impact sufficiently to degrade performance so long as the distance is small enough that the oscillation has not caused the stream to break into separated droplets. A spacing of about four millimeters has been found to be satisfactory.

FIG. 5 comprises a plan view of a small part of a citrus orchard or the like protected from frost damage in practice of this invention. As illustrated in this embodiment, a high pressure pump and filter system 61 is connected to a pipe manifold 62 extending along one edge of a grove of trees 63. Connected to the manifold 62 and extending through the orchard at an elevation of more than about 25 feet above ground level are a plurality of pipes 64, each fitted with a plurality of fog producing nozzles 65 along their length. During a calm night when cool air may pocket in the orchard, the system is activated for producing the fog at the nozzles 65, which serves to raise the dew point in the orchard and also generate substantially opaque fog.

In addition to the fog producing pipes 64 extending through the orchard, it is desirable to provide one or more pipes 66 also having fog nozzles 65 at an elevation of more than about 25 feet along at least one edge of the orchard. In the illustrated arrangement, a single high pressure pump and filter system 61 is illustrated, however, it will be apparent that a plurality of such systems may be employed or valving may be used for operating some or all of the fog producing portions as may be desired.

The fog produced in the orchard has a high average density and tends to lie near the ground and actually flows downhill since it is more dense than the surrounding air. The extra bank or banks of fog nozzles along the edge of the orchard are preferably at the uphill edge for producing a surplus of fog in this region, which slowly drifts downhill through the balance of the orchard. When an orchard is arranged on a slope, it may be necessary only to have fog generating means along the uphill edge of the orchard permitting the natural flow of the fog to the downhill portions to provide frost protection throughout the area to be protected. If, on the other hand, the orchard is in a substantially flat area, it is preferred to employ fog generating nozzles throughout the orchard for protecting the full area.

Even in a substantially flat area there is a gradual drift of air downhill since virtually no agricultural area is actually completely flat. Although this drift may be slow, it can raise a problem if the air entering the orchard is below freezing due to heat transfer to surrounding areas that are not protected by a system as provided in practice of this invention. In such a situation it is desirable to employ the banks of fog nozzles along the uphill edge of the orchard to assure protection of the first few rows of trees therein.

If the air entering the uphill edge of the orchard is already below the freezing temperature, it may be desirable to augment the protective effect of the fog producing system provided in practice of this invention, and means may be provided for adding heat to the area along at least the uphill edge of the orchard. Radiant heaters or the like can be employed since this tends to warm the fog and heat the surrounding region; however, most such heaters have a substantial heat loss to higher altitudes due to convection currents, and they do not always prove economical.

One way useful in combination with the fog producing system employs a plurality of conventional sprinklers 67, indicated only schematically in FIG. 5, along at least the uphill edge of the orchard. The water supplied to the sprinklers 67 is preferably substantially above the freezing point and may, for example, be heated to 90° or 100° F with great benefit. In some regions natural ground water is this warm, however, in most areas it is necessary to heat the water prior to sprinkling through the sprinklers 67. This heating can be done with ordinary fuels, however, it is possible to employ solar energy for heating the water which is then stored until needed. This turns out to be an excellent way since the supplemental heating obtained by sprinkling is required only during relatively brief periods, and solar energy is conveniently accumulated and stored in water stored in insulated reservoirs.

The water employed in the fog nozzles can also be heated if desired in order to enhance the heating effect adjacent the edge of the orchard. This is not always sufficient for preventing frost damage as cold air drifts into the orchard from surrounding regions since the total quantity of water that is injected into the environment from the fog nozzles is relatively small, and the total heat that can be added by using warm water in the fog nozzles is relatively small compared with the heat that can be added by employing sprinklers in combination with means for generating fog.

It will be apparent that if desired such an arrangement can be employed for protecting crops other than orchards or the like. Other arrangements of pipes in or near an orchard can be used depending on local conditions.

In order to operate the system illustrated in FIG. 5 for protection of crops from frost damage, temperature is monitored, and when the temperature reaches no less than about 40° F and threatens to reach freezing, the pump and filter system 61 is started so as to inject water droplets in the size range of from about 5 to 50 microns from the nozzles 65 into the air surrounding the crops. Typically, when the temperature drops to this range the relative humidity concomitantly increases and saturation of the air mass with water vapor due to evaporation of the droplets rapidly occurs. Thereafter, a visible fog is produced having a multitude of water droplets in the size range of from about 5 to 50 microns and with an average droplet diameter in the range of about 10 to 30 microns.

The frost protection technique provided in practice of this invention generates real fog which is equivalent in every way to natural fog and is the most effective and economical system available. The principles involved are simple. First, the fog system raises the humidity and dew point, and high dew points and high humidity prevent rapid cooling of fruit and blossoms because of the release of latent heat of condensation when water condenses onto the fruit and blossom surfaces. Second, cooling rates are further inhibited when radiation losses are slowed down because of the fog blanket.

The described technique is unique and different from other fog systems because it produces a cool dense fog which naturally puddles in low-lying frost pocket areas where it is needed the most. Since an inversion is not required to hold the fog down, the fog can be produced at any time regardless of temperature. Also the operating costs are so low, about ½ cent per acre per hour, that it is economically feasible to start the system just before sunset when the radiation cooling begins, and run it all night until several hours after sunrise. Cooling is thus inhibited from the very beginning while temperatures are still warm, instead of waiting until frost danger is imminent.

Frost will not occur if fog forms naturally before the temperature falls below the freezing point. The problem has been that up until now no one has been able to build a fog generating machine that would economically produce large volumes of fog with the correct drop sizes with an adequate amount of water in the fog to act as a heat conserving blanket in the same manner as a natural fog. These problems are solved in practice of this invention.

Radiation frosts occur on clear nights with no wind, particularly under atmospheric conditions of low humidity and low dew point. The mechanism which causes the cooling is radiation heat loss from the earth's surface and from the plant leaves and fruit blossoms. As energy is lost, surface temperatures are lowered and the air in contact with the surfaces is thus also cooled. An important factor to remember in the economical use of frost protection schemes is that it is the earth and plants that cool the air rather than the air that cools the plants. When fog is present it reduces radiation losses and water condenses on the plants and prevents the surfaces from cooling and thus also prevents the air from cooling.

In hilly terrain the frost danger is made worse in the low-lying areas because the air that is cooled by contact with the earth on the hillsides always flows downhill and puddles in the basin areas where it is further cooled because of continuing radiation losses. Natural fog and the fog produced in practice of this invention also naturally puddle in low-lying areas where it is needed most.

Typical cooling rates on a clear frost-prone night are about 3 degrees per hour. Tests with this invention indicate that this rate can be slowed to about 0.3 degree per hour. If the radiation loss can be stopped or slowed down, then the cooling will not be adequate to cause frost. Fog serves to stop the cooling in several ways. One way is the blanketing effect; however, to be effective as a blanket the fog must have droplets that are just the right size to back scatter the longwave radiation emitted by the earth's surface. The proper drop size is between 10 and 50 microns in diameter. Larger droplets fall to the ground and smaller droplets are not effective as radiation reflectors. Such a fog having a major portion of droplets in the size range of from about 5 to 50 microns and an average diameter in the range of from about 10 to 30 microns is readily obtained in practice of this invention.

Another important factor is that there must be enough water in the fog. About 10 to 15 grams of fog water in the proper drop sizes are required over each square meter of ground surface to reduce the radiation loss to one-tenth of its clear air value. The depth of the fog is relatively unimportant but typically would be 30 to 300 feet. If there is less water than this in the fog, the radiation losses would be correspondingly greater. Tests with this invention have produced fogs 30 to 50 feet deep with a liquid water content of 2 grams per cubic meter. This is equivalent to more than about 20 grams of fog water over every square meter of ground.

Another way in which pure water fog helps to reduce frost damage is through the release of latent heat of condensation, over 570 calories per gram of water condensed. Since in pure water fogs the relative humidity is always 100%, if the fog temperature is above the freezing point of the crop to be protected, then the dew point temperature must also be above freezing and in fact will equal the fog temperature. This fact is very important since the dew point is the temperature at which water will condense onto a surface. Leaves and blossoms cannot cool below the dew point because water will condense onto the surfaces and the release of latent heat causes that surface to be heated. The fog frost protection system provided in practice of this invention offers a number of advantages over other fog systems. One of the most important factors is that the fog is not heated but rather is cool and dense and thus naturally seeks out the low-lying frost pocket areas. It is very important that frost protection fog be cool. With a warm fog it would be extremely difficult and perhaps impossible to target the fog over the desired frost-danger areas. This happens because the cold air, which always must slide downhill and puddle in the frost pocket areas, must also displace the air that lies just a few feet about the ground. This means that very often the air just a few feet above the ground will drift uphill while the cold air is drifting downhill. Thus warm fog will always have a tendency to drift away from frost danger areas. On the other hand, the cool fogs produced in practice of this invention always have a tendency to drift into the low-lying areas which is exactly where the fog is needed the most. Installation costs of the fog system are typically $600 an acre or less and operating costs about one cent per acre per hour. Tests indicate that on radiational cooling nights the system should be capable of maintaining above-freezing temperatures on nights that would normally cool down to 18° F. Because the operating costs are so low, the system in a typical installation may be activated before sunset on frost danger nights and allowed to run until several hours after sunrise. Thus heat is conserved as soon as cooling takes place at sunset and, under most situations, above-freezing temperatures are maintained all night long. Other benefits of a frost protection system in a citrus orchard or the like are its uses for cooling and humidifying on hot dry summer days. The properties of the atmosphere are such that when the temperature is cold, evaporation can produce only 2 to 3 degrees of cooling. This is because the atmosphere can hold only a small amount of water vapor at low temperatures. For example, the maximum amount of water vapor that the atmosphere can hold at 30° F is 4 grams per cubic meter; at 120° F it can hold 90 grams per cubic meter. Once the atmosphere is saturated with water vapor, any additional water will cause fog droplets to form. (It is important to realize the distinction between the liquid water that forms cloud droplets and the water vapor which causes humidity and is always present in the air). Thus on a typical frost-prone night when the humidity might typically be 80% at sunset with a temperature of 45°, the maximum evaporative cooling that could occur would be 3°. When the fog system of FIG. 5 is turned on under these conditions the temperature of the fog would immediately drop to 42° and would then stabilize. However, on a hot summer day when the temperatures are 110° and the humidity 10%, the system of FIG. 5 would produce no fog because all of the droplets would evaporate immediately, but in evaporating the temperature of the lower 10 to 20 feet of air would typically be lowered from 110° to about 85° and the humidity raised from 10% to about 50%. This has important applications for some farm crops such as citrus where fruit drop is caused by high temperatures and low humidities and in some cases the viability of fresh buds is affected by high temperatures.

In addition to the cooling effect and rise in humidity that is obtained by injecting water droplets in the size range of from about 5 to 50 microns into the environment near an orchard, a significant benefit can be obtained by enhancing crop growth. It will be noted that the air that is cooled in practice of this invention is more dense than the surrounding air and therefore tends to lie near the ground. The cooling and high humidity are therefore obtained in the region adjacent the crops where it is most needed. One of the factors that influences the rate of crop growth is also the carbon dioxide availabity in the environment.

Typically, the total carbon dioxide concentration in the atmosphere is about 0.3 gram per cubic meter of air. It has been found that by increasing the carbon dioxide concentration to about 2.4 grams per cubic meter in greenhouses or the like, very significant increases in the rate of crop growth are obtained. The same effect is obtainable in the open environment in practice of this invention since cool air that tends to lie near the ground is produced and any carbon dioxide added therefore also tends to remain near the ground and in the region where it is best assimilated by the crops.

Referring again to FIG. 5, an injector 68 is provided in combination with the filter 61, which in a preferred arrangement injects carbon dioxide under pressure into the water supply. The injection of carbon dioxide can be either before or after the pumping system, however, the solubility of carbon dioxide in water increases substantially with increasing pressure. Thus at normal ambient temperatures and pressures, the solubility of carbon dioxide in water is about 0.3 gram of carbon dioxide per 100 grams of water. At a pressure of about 30 atmospheres, which is preferably employed in practice of this invention, the solubility of carbon dioxide is over ten times as high as at atmospheric pressure.

It should also be noted that it is not necessary that the carbon dioxide injected into the water supply be entirely in solution in the water, and that bubbles of carbon dioxide can pass through the pipes and fog nozzles without any detrimental effect. Although it is preferred that the carbon dioxide be injected into the environment by way of an injector 68 in combination with the fog producing system, it will be apparent that other means for generating or releasing carbon dioxide in the cooled air adjacent the orachard can be employed as desired for enhancing crop growth during the day.

The injector 68 may also comprise means for injecting other materials into the water supply instead of, or in addition to, carbon dioxide. Thus, for example, foliar feeds are often applied directly to the foliage of orchards in order to fertilize the trees with very little loss of fertilizer to the ground. The injector 68 can be employed for mixing such foliar feeds with the water injected into the environment by the nozzles so as to fertilize the crops at the same time they are cooled. Such fertilizing can be employed at any desired time and may not be deferred until such time as temperature is high. It may be, for example, desirable to provide such fertilizing during the nighttime hours when breeze conditions are typically less severe and minimum dispersion of the fertilizer is obtained.

It will also be apparent to one skilled in the art that fungicides, insecticides and other similar materials may be injected by the injector 68 in order to provide protection to the crops. Thus, the injector 68 may add most materials that are soluble in water or which can be put into the water supply in a fluid form, either as gas bubbles in the case of carbon dioxide, or emulsified liquids as in the case of certain insecticides. If any particulate materials are added to the water, the particle size should be less than about 10% of the diameter of the nozzle orifice in order to minimize any opportunity for plugging of the fine orifices in the nozzles.

FIG. 6 illustrates in elevation a fragment of a frost protection system constructed according to principles of this invention. As illustrated in this embodiment, poles 20 about 40 feet high are positioned along the edge of a region to be protected. Such poles are provided along the updrift direction, that is, the direction from which cold air is most likely to drift into the region to be protected. Typically, this is predictable and is an uphill edge of the region. In some areas, however, the direction of drift may be variable and provision of a frost protection border may be desirable along more than one edge of the region. In addition, similar poles for supporting a fog generating system high above the ground may be provided throughout the region to be protected to assure that a continuous bank of fog is maintained.

A cable 21 is stretched between the tops of the poles to provide a supporting tension network. Short hangers 22 connect a plastic pipe 23 to the cable 21. In the illustrated embodiment the length of the hangers is somewhat exaggerated and, if desired in some embodiments the pipe may be tied directly to the cable. A plurality of fog generating nozzles (not shown) are spaced along the length of the plastic pipe 23 at a frequency of about one to three such nozzles per foot of length of the pipe. These nozzles are preferably of a type for generating fog as hereinabove described and illustrated. A plastic pipe or flexible hose 24 comes down from the plastic pipe 23 to a conventional pump and filter set 26 illustrated only schematically. Any convenient pump capable of delivering water at more than about 350 psi is suitable. As pointed out hereinabove, a filter or filters should be incorporated for removing all particles in excess of about 5 microns in order to avoid plugging the very fine nozzles used for generating fog.

A second cable 27 is connected between the poles 24 at a height of about 15 feet above ground level. Short hangers 28 connect a plastic pipe 29 to the cable for supporting the pipe. A plastic pipe or hose 30 drops from the pipe 29 to a conventional water heater 44 which is connected to the outlet of a conventional pump and filter set 45. The water heater is used to raise the temperature of water fed to the pipe 29 to about 100° F, although as pointed out hereinafter, higher or lower temperatures may be used as desired. Also, if water at a sufficiently elevated temperature is otherwise available, the water heater may be dispensed with. The pump and filter set 45 delivers water at a pressure of about 100 psi and if clean water is otherwise available at such pressures such as from culinary supplies, the pump and filter set adjacent the region to be protected may also be dispensed with in whole or in part.

A number of water spray nozzles (not shown) are spaced along the lower plastic pipe 29. The nozzles may be directed either up or down or laterally, as convenient. These nozzles preferably produce water droplets primarily larger than about 100 to 120 microns in average diameter. Preferably pin jet nozzles of the same general type hereinabove described and illustrated and having an orifice of about 0.02 inch diameter are used. It is found that with a pressure of about 100 psi, droplets in the preferred size range are produced by such nozzles. If desired, other types of nozzles may be used for producing the water droplets from the lower pipe. Preferably the spray pattern from the nozzles on the lower pipe 29 is such that the width of the spray pattern is about 6 to 8 feet. The falling spray of water from the lower pipe 29 is thus about 15 feet high, 6 to 8 feet wide, and extends the full length of the plastic pipe. Hereinafter this spray of water droplets in a size range greater than about 100 to 120 microns may be referred to as a water curtain.

As mentioned above, colder air from surrounding areas may drift into an area protected by fog generated in practice of this invention. To enter the protected area, such colder air must flow through the water curtain provided along the updrift edge of the region to be protected. This colder air thus encounters a region filled with relatively slowly falling water droplets in the 100 to 120 micron size range which have a temperature substantially above the temperature of the colder air. Heat is transferred from these droplets to the air thereby raising its temperature and at the same time, some water evaporation occurs, raising the absolute humidity of the air.

With the lower pipe 29 about 15 feet above the ground, water droplets having an average size of about 100 to 120 microns transfer substantially all of their sensible heat to the surrounding air before they reach the ground when the relative humidity is high. When the humidity is low larger droplets are preferable. At about ground level the air and water droplets are at substantially the same temperature and the air is saturated with water vapor. This is optimum, and droplets that fall at a rate just sufficient to come to equilibrium with the surrounding air just at ground level are the optimum size. Droplets that cool before reaching the ground may be partly ineffective and require excess energy. Droplets that are too large fall too fast and transfer heat to the ground rather than the air. Thus preferably, the droplets of water in the water curtain have a selected average size generally dependent on the height of the top of the water curtain above the ground. The water droplets should be sufficiently large that a major portion thereof fall to ground level. The droplets should not be too large, however, since this is wasteful of heat. Preferably the droplets are sufficiently small that a major portion of the water has come to equilibrium with the surrounding air before reaching ground level. This avoids heating water just to transfer the heat to the ground under the water curtain.

Droplets in excess of about 100 microns are important in the water curtain to assure that a substantial portion falls to ground level. When the relative humidity is about 100%, the droplets do not lose significant size as they fall and will drop to ground level. When the relative humidity is low, larger droplet sizes may be preferred so that evaporation does not reduce droplet size to a point that they no longer drop to ground level. Desired droplet size also depends to some extent on the thickness of the water curtain. Thus if the air drifting into the area to be protected passes through several feet of falling droplets, those droplets near the up-drift direction may completely evaporate before reaching ground level whereas those at the down-drift edge may fall to ground level and reach equilibrium with the surrounding air before doing so. In such a situation droplets smaller than about 100 microns can be used, but high pressure systems and other more expensive techniques may be needed to obtain the smaller droplets. Thus 100 micron diameter droplets are a practical minimum.

The droplets in the water curtain should not be so large that they do not come to equilibrium with the surrounding air to avoid uneconomical operation. It should be noted that equilibrium refers to both temperature and vapor pressure equilibrium. The droplets cool to the temperature of the air in their immediate vicinity. Evaporation of water from the droplets also raises the surrounding air to about 100% relative humidity or saturation with water vapor. High relative humidity in the air adjacent crops to be protected is highly desirable. The crop surfaces may lose energy by radiation but they can not cool below the dew point since water from the air condenses on the surfaces and replaces the lost energy. If the relative humidity is low the dew point is low and plant surfaces may cool to dangerously low temperatures. The water curtain serves to raise the relative humidity as well as adding heat energy to the air and provides crop protection not available from heat additions alone.

The same effect can be obtained with a pipe located more than about 15 feet above the ground, however, this is a more expensive installation and may require heating of a substantially larger volume of air which may be drifting into the area to be protected, and this is normally not necessary since most crops, including trees, are less than about 15 feet above ground level. For some crops and vicinities, the lower pipe 29 can be less than 15 feet above ground level, however, smaller drops are required in order to transfer all of their heat before they reach the ground. Formation of these smaller drops requires greater energy and generally higher pressure systems than the nominal 100 psi which can be employed with a pipe at about 15 feet above ground level.

As an example of the effectiveness of a water curtain, if it is desired to raise the temperature of the air about 5° F, with a drift rate of about 2½ miles per hour, water sprayed at the rate of about 75 gallons per minute at 100° F is sufficient for a 100 foot long water curtain when the relative humidity is about 100%. If the water temperature is raised to about 120° F, only 40 gallons per minute is needed for a 100 foot long water curtain. About 105 gallons per minute are needed if the water temperature is only 70° F. If the water is heated to about 210° F, only 20 gallons per minute are needed for a 100 foot long water curtain. When the relative humidity is only 40% about 130 gallons per minute of 100° F water is needed per 100 feet of water curtain for a 5° F temperature rise.

In a typical frost situation, 1° or even ½° Fahrenheit may be the difference between successful protection of the crop and significant frost damage. Provision of a water curtain along the edge of a region to be protected can assure that the blanket of fog generated adequately protects the crops throughout the region. In addition, because the absolute humidity of the air as well as its temperature has been raised by the water curtain, it is found that the quantity of water that must be provided by the high pressure fog generating system may be reduced by as much as 80%. Typically a bank of fog that reduces radiation by 80% is about 30 feet thick and contains ten grams of water droplets per square meter of ground covered. The amount of heat reflected back to the ground is dependent on the total mass of water droplets in the fog so that a more dense fog may not be as high.

Preferably, the water curtain is provided at a temperature of about 100° F since water heaters are more efficient at the somewhat lower temperatures and there is little danger of heating the volume of air drifting into the field to such an extent that it becomes significantly less dense than the surrounding air and rises so that it is not effective for crop protection. Higher temperatures in the water may also limit the use of plastic pipe. However, when steel or fiberglass pipe is used higher temperatures can be advantageous. For example, when it is desired to use less water for a given quantity of heat, steam may be ejected.

A substantial amount of the water provided by the water curtain does not evaporate from the falling droplets and reaches ground level. Since the updrift edge of the region is typically the uphill edge as well, water from the droplets may be permitted to flow down the normal irrigation channels present in an orchard, for example. If desired, however, a shallow ditch may be provided beneath the water curtain so that the water trickles back to a sump (not shown) from which the pump supplying water to the water curtain picks up a portion of its water. In this way a substantial portion of the water in the water curtain may be reheated and recirculated. Clearly, if this is done, a filter is needed to prevent debris carried by the water from plugging the water spray nozzles.

Additional effective heating along the edge of a region to be protected is provided by placing the fog generating system as represented by the pipe 23 in FIG. 6 at a distance above the ground of more than about 25 feet and preferably at about 35 to 40 feet elevation. The additional effective heating obtained by placing the fog generators this high may be sufficient that supplementary heating along the edge of an area to be protected may not be required.

Typically in a clear air frost situation heat is lost from plant surfaces by radiation to the clear sky. The cooling of plants and ground surfaces by radiation results in cooling of the surrounding air since heat is transferred from the air to the plant surfaces. As a consequence, it is usual for a surface temperature inversion to occur wherein colder air is near the ground and warmer air is found at higher elevations. This is a well known effect and is advantageously used by "wind machines" which artificially create a wind that draws some of the warmer air from the natural inversion and mixes it with the cooler air near the ground to prevent the temperature of plant parts from dropping below their freezing point as they lose heat by radiation.

When the fog generators are placed at a substantial distance about the ground, preferably more than about 25 feet, there is, in addition to the blanketing effect of the fog which reduces radiation losses and conserves heat energy in the plants and in the soil, an actual addition of heat energy to the air at crop level. This is because the fog is generated high in the surface temperature inversion at the level wind machines are usually placed. The fog mixes with warm air at that level and carries this warmer air down with it to crop level, thereby providing a heating effect like that caused by the wind machines. The warmer air high in the temperature inversion plus entrained fog droplets is more dense than the adjacent air absent fog and tumbles towards ground level.

The amount of heating will depend on factors such as inversion temperature, humidity, and wind speed. The inversion temperature determines the magnitude of the wind machine effect; humidity determines the amount of water necessary to produce a fog and the amount of evaporative cooling at the top of the fog; and wind speed determines the rate at which fog water must be applied to obtain the effect. Under any given condition if the wind speed is doubled the amount of water necessary to produce a fog of given density will also double.

Figure 7:
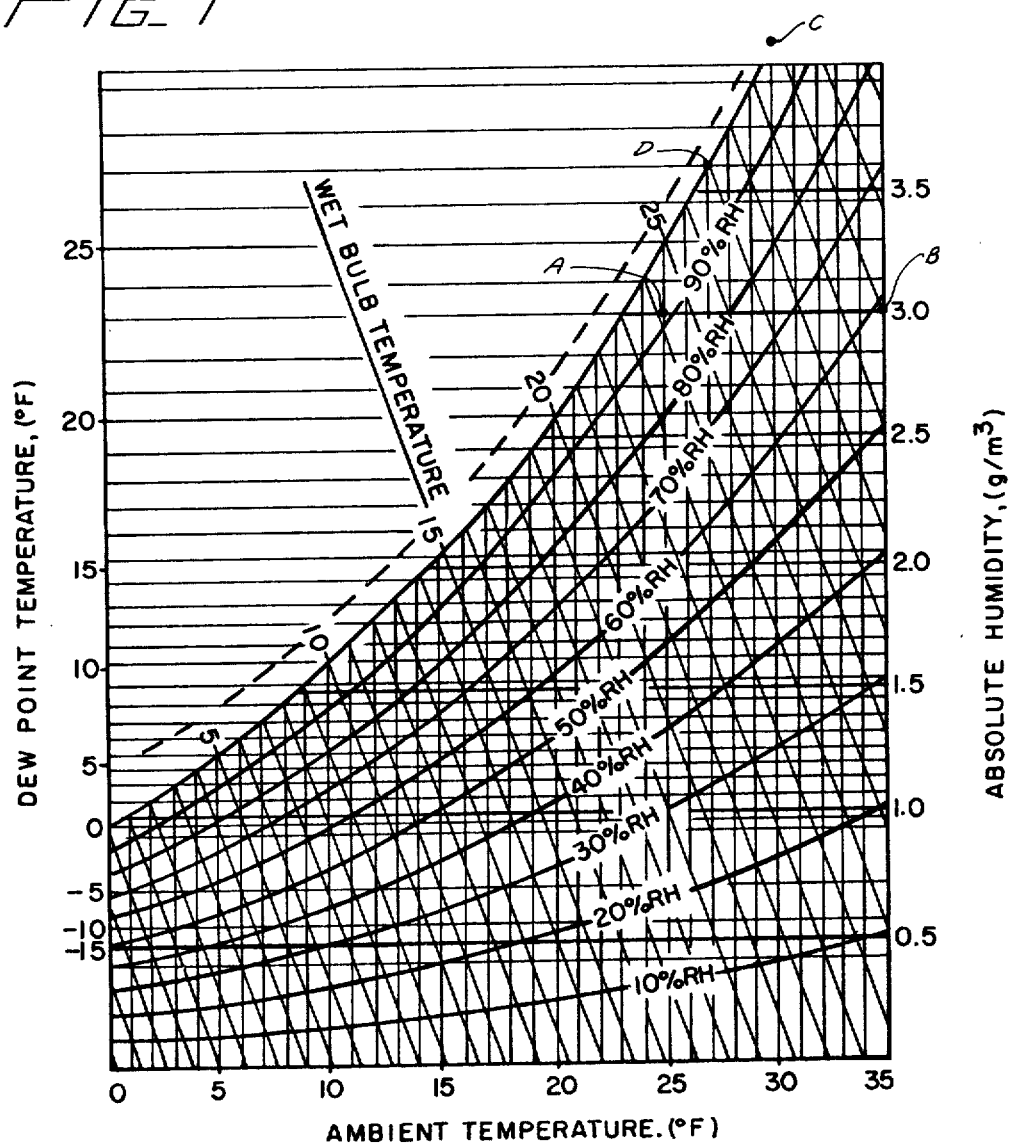
FIG. 7 is a graph relating temperature and humidity.

FIG. 7 is a graph relating temperature and humidity. The abscissa of this graph is the ambient temperature in degrees Fahrenheit. The vertical scale, as indicated along the right-hand margin of the graph, is the absolute humidity in grams per cubic meter. The absolute humidity is the total weight of water vapor in the air and does not include condensed water droplets. The dew point temperature is indicated along the left-hand margin of the graph. The dew point is the temperature at which condensation occurs for the selected absolute humidity. The dew point temperature is the saturation temperature (or boiling point) corresponding to the actual vapor pressure of the water.

A series of diagonal straight lines are plotted on the graph of FIG. 7 and represent the wet bulb temperature, also in degrees Fahrenheit as indicated by the numbers on the face of the graph. The wet bulb temperature is the temperature achieved by water permitted to freely evaporate into air at a selected absolute humidity and temperature. The wet bulb temperature lies between the dry bulb or ambient temperature and the dew point temperature (except for air saturated with water vapor for which all three temperatures are identical).

Relative humidity is the ratio of the actual vapor pressure of water to the pressure of saturated water vapor at the prevailing dry bulb temperature. When air is saturated with water vapor it is at 100% relative humidity. A series of curved lines are plotted on the graph of FIG. 7 representing different relative humidities (RH) in percentage of saturation.

To illustrate the wind machine effect of fog generators high in a surface temperature inversion, assume that the air at a 5 foot elevation flowing into the fog protected region has a temperature of 24° F with a relative humidity of approximately 95% and a dew point of 23° F. Under such conditions there would undoubtedly be dew and frost formation on the ground (it should be recalled that crop damage does not occur at 32° F, the freezing point of water, but may be appreciably lower, and actually differs depending on the crop). If the inversion temperature at the height of the fog generators (for example, 40 feet) is 35° F, then the relative humidity at that elevation would be approximately 60%. Such conditions are representative of typical potential frost situations. These typical conditions are indicated on the graph of FIG. 7. The starting condition at the 5 foot elevation being indicated at point A and the conditions high in the inversion being indicated at point B.

As the air mass drifts into the fog protected region at the 40 foot elevation, some of the fog being generated at that altitude will evaporate, causing the air at the 40 foot elevation to cool to about 30° F while raising the dew point to about 30° F and the relative humidity to 100%. Such value is found from the graph of FIG. 7 by moving up and to the left along the wet bulb temperature line passing through point B to point C. Because the 40 foot elevation air plus the mass of fog droplets is now more dense than the surrounding air at that level, it tumbles and mixes with the air below. Its inertia may carry it to ground level as it mixes. The resulting mixture has a temperature of about 27° with a dew point of 27° F and a relative humidity of 100%. In terms of heat content this is the same as raising the original air mass temperature by about 5° to an equivalent temperature of 29° F. This value is noted by moving from point D which represents the temperature and humidity conditions of the mixed fog and air, down and to the right along the web bulb temperature line to the original dew point temperature of 23° F. The equivalent temperature for anything less than saturation is higher than the mixed fog and air condition because heat is removed from the air to evaporate water. Thus, the air at crop level has gained a quantity of heat in the form of increased temperature and added water vapor which is equivalent to about a 5° temperature rise in the original cold, 95% relative humidity air.

In terms of heat input to the air at crop level, this is very substantial. A mass of air 15 feet deep moving across a 300 foot length of border at 5 miles per hour requires approximately 12 million Btu per hour to raise its temperature 5° F. This quantity of equivalent heating may be added by positioning fog generators high in the surface temperature inversion.

It will be noted that although the fog generating system does not actually add a substantial amount of heat to the total air mass flowing over a farm crop the results can be described in terms of equivalent heating. By reducing radiation losses the fog system conserves heat and makes it available to the crops. By moving warm air down to crop level from high in the inversion the fog causes heat to be added at crop level even though no heat was actually added to the total air mass system. The heat is simply redistributed to where it is needed.

Under the conditions described in this example, an 80% opaque fog bank conserves up to 1.5 million Btu per acre hour of heat energy which would be the equivalent of burning 40 to 60 conventional oil fired stack heaters per acre under clear sky conditions. In addition, the wind machine effect along the border provides the equivalent of 12 million Btu per hour for each 300 feet of updrift border.

The prevention of radiation energy loss by the fog is in no way affected by the temperature inversion. The fog covers the fields and prevents radiation loss regardless of whether there is an inversion. The wind machine heating effect is dependent upon the inversion temperatures. If there is no inversion, there will be no wind machine heating effect. Even with a substantial inversion and high humidity the maximum heating effect that can be obtained is approximately one-half the difference between ground level temperature and the temperature at the fog generating level. The magnitude of the inversion at elevations less than about 25 feet is often not sufficient to justify the added cost of substantially elevating the fog generating system. Preferably, in order to take advantage of higher inversion temperatures, the fog is generated at an elevation of about 35 to 40 feet. The expense to going more than about 40 feet about ground level may not be justified in most cases.

It should be noted that the ground level of interest is that of the region to be protected and if it is adjacent a hill or the like, additional height can often be obtained economically by positioning the poles for supporting the pipe with fog generating nozzles on the hillside. The fog nozzles can also be directed upwardly and the fog droplets coming from them in a cone shaped pattern will mix with air above the nozzles before reversing direction and drifting downwardly. By this simple expedient additional effective height can be obtained for reaching higher in the temperature inversion without added cost.

A typical figure for radiation heat loss from farm fields is about 1 to 1.5 million Btu per acre hour. A fog barrier containing about 10 grams of water droplets in the size range of from about 10 to 20 microns over each square yard of ground surface reduces the heat level loss by about 80%. Thus, the blanketing effect of the fog eliminates the loss of about 0.8 to 1.2 million Btu per acre hour which is the equivalent of adding that much heat energy to the field. It should be realized that because of the inefficiency of stack heaters it would require about five times more than the burning of 0.8 to 1.2 million Btu per acre hour fuel oil or about 40 to 60 stack heaters to accomplish an equivalent amount of heating.

The small amount of radiation energy that does escape through the fog tends to be replaced by heat that is released when water vapor condenses and freezes on leaf and fruit surfaces. This occurs because a surface when it loses energy by radiation tries to cool below the ambient air temperature. Since the dew point in a fog is the same as the ambient air temperature, any surface cooling, even by a fraction of a degree, will cause water vapor to condense on that surface and freeze if the temperature is cold enough. This condensation plus freezing releases latent heat energy at the rate of approximately 10,200 Btu per gallon of water. Since a fog under typical conditions reduces the radiation loss to only about 200,000 to 300,000 Btu per acre hour, a dew formation of ⅛ to ¼ gallon per acre minute is sufficient to make up the radiation losses. There is also conduction cooling when air temperature is below crop surface temperatures. By placing a continuous line of fog generation high in a temperature inversion, warmer air is brought to crop level and conductive cooling from the crop to air is reduced or eliminated. The predominant effect for leafy crops is still radiation, however, and the leaves usually are cooler than the surrounding air. Condensation and even frost formation are often desirable.

It will be noted that throughout the description mention is made of frost damage. The important element is that there be protection against freezing of a crop which ordinarily occurs only at a temperature substantially below the freezing point of water. In the agricultural business the terminology "frost protection" is commonly used when what is meant on a technical basis is "freeze protection of the crop." Frost, in a technical sense, is a condition where ice forms on surfaces and such ice is not necessarily indicative of freeze damage to a crop. In many situations, particularly in practice of this invention, the formation of frost or ice on plant surfaces can actually be beneficial since the latent heat tends to maintain the temperature of surfaces that would otherwise be cooled by radiation. As used herein, frost protection and freeze protection, and frost damage and freeze damage are synonymous.

Since it is important that the protection afforded by the fog is against freezing of the crop, it will be apparent that the depth of fog must be sufficient to cover the crop with a sufficient quantity of fog water to minimize excessive radiation losses. This is another advantage of placing the continuous line of fog generation nozzles at a substantial elevation above the area to be protected. Generating the fog at higher elevations assures that it is of sufficient depth to cover taller crops such as citrus orchards or the like. It also brings the warmer temperature inversion air down to the upper levels of the crop which are susceptible to substantial radiation losses.

It has been found that when sufficient fog is generated along an updrift boundary of an area to be protected it is not necessary to have fog generating nozzles spread throughout the area. When the quantity of fog ejected in the temperature inversion is sufficient to raise the relative humidity air volume occupied by the fog to 100% and provide at least five grams of fog droplets over each square meter of area to be protected, frost protection is still obtained. Five grams of water in the form of fog per square meter cuts radiation loss to about 50% which may be adequate in some situations. This quantity of water in the form of fog droplets should be present at the remote edges of the area to be protected and larger quantities of water in the form of fog droplets may be present in the air in regions closer to the source of fog.

Conversely, it is found that if fog generators are distributed through an area to be protected rather than being provided along an updrift boundary, uniform freeze protection is not provided. This occurs since in any practical situation where freezing is likely to occur there is always a moderate drift of air or low velocity wind. As a minimum there is an average drift of air in one direction at a velocity of about one meter per second. There may be short periods of time (in the order of a few seconds) where, in some regions of an area to be protected, there is no significant air flow, and at other times there may be minor reversals of flow direction into what is normally the updrift direction. On the average though, there is a drift in one direction at about one meter per second. It should be noted that a drift velocity of this magnitude is considered as "calm" by weather bureau standards since most mechanical anemometers are not sensitive enough to detect these velocities.

At a maximum the wind velocity during radiational freezing conditions is about 2 meters per second. When the wind velocity becomes this high there is sufficient turbulent mixing with overlying air that it is unlikely that there will be any crop freezing. Such turbulent mixing with a wind velocity of about 2 meters per second may extend as high as 300 feet above ground level and the continual influx of warmer air prevents freezing.

Because of the steady drift of air through an area to be protected, scattered fog generation devices throughout the area are ineffective, each such device produces a plume of fog and the plumes may meet downwind from the source only if sufficiently close together and if each source produces sufficient fog to avoid dissipation of the plume before it meets another. No freeze protection is provided in the region between such plumes, nor upwind from the individual sources. The cumulative effect of such scattered sources may produce the needed 5 to 15 grams of fog water per square meter at some point after sufficient plumes have merged. To protect an area a certain quantity of water in the form of fog droplets must be dispersed and if it is dispersed uniformly through the area the updrift portions do not receive adequate freeze protection. The only way to assure crop protection throughout an area is found to be with a continuous line of fog generation along the updrift boundary. This provides protection immediately adjacent the boundary and also for a substantial distance in the downdrift direction. The distance that can be protected depends on the quantity of water ejected as pointed out in greater detail hereinafter.

To effect this frost protection it is important that at least about 15 grams of fog droplets be ejected into the upper reaches of the inversion per second for every meter of length of the continuous line along the updrift boundary of the area. From 20 to 35 grams of water droplets per meter per second is commonly required. Thus, to protect an area ¼ mile downwind from the continuous line of fog generation about 19 grams of water in the form of fog droplets are needed per meter per second in the following example. It is assumed that the temperature is about 30° F, the dew point is about 27° F, and there is nominal wind velocity of about 1½ meter per second. If one desires a 10 meter fog depth it is necessary to eject water at the rate of about 7.5 grams per meter per second to saturate the incoming air with water vapor. An addtional 11.6 grams per meter per second of water in the form of fine fog droplets is required for the fog to remain with a water content of at least 5 grams per square meter of surface at a distance of about ¼ mile. This is a total of about 19 grams of water per meter per second.

To provide a full margin of safety it is assumed that fog nozzles as hereinabove described are about 80% efficient in practical embodiments, that is, about 80% of the water ejected through the nozzles is in the form of fog droplets and the balance may be in the form of droplets that are sufficiently large that they fall to ground level before travelling any substantial distance from the line of fog generation. This is partly accounted for by droplets hitting adjacent structures or other spray patterns and partly because of an occasional defective nozzle. Therefore, under such conditions about 24 grams of water is ejected per meter of updrift line per second to achieve the required usable amount of 19 grams per meter second of fog water needed.

These conditions are prevalent in a situation where the continuous line of fog generation is sufficiently long that there is not much edge effect, namely that the effect of mixing of the edges of the bank of generated fog with surrounding air is not great. Unless the fog is generated along a continuous line of appreciable length, dryer air mixing into the side edges of the fog bank causes droplet evaporation to raise the relative humidity of the air mixed in. Such a narrow band of fog rapidly dissipates to a point where insufficient fog water remains for adequate frost protection.

When fog is generated at a substantial elevation along an updrift boundary of an area to be protected and in a continuous line extending a substantial distance, there is some loss of water from fog droplets near the top of the fog bank due to mixing with overlying air. Ordinarily under freezing conditions this is not a significant effect since the temperature inversion maintains the fog near ground level. Most of the loss of water from the fog droplets is in the form of dew on the crops being protected. Although this reduces the quantity of water in the fog droplets it also provides substantial frost protection. Even when such losses are occurring they are relatively minor when the fog bank is continuous over a substantial distance. Thus, for example, under the conditions mentioned above about 24 grams per meter per second of water is ejected to provided frost protection for a distance of about ¼ mile downwind from the fog generation line. By increasing the amount of ejected water to about 27 grams per meter per second the fog bank will extend about ½ mile from the continuous line. If one ejects about 35 grams of water per meter of line per second under the above-mentioned conditions, the bank of fog may provide frost protection for about 1½ miles downwind from the continuous line, however, the length of the fog line must be extended to at least ¾ mile to reduce the erosive edge effects caused by mixing of dry air around the edges.

The minimum water ejection of about 15 grams per meter of continuous line per second is feasible when the distance to be covered is relatively small and the air in the area to be protected is already substantially saturated with water vapor. Similarly, low wind conditions may permit one to reduce the quantity of ejected water to near the minimum of 15 grams per meter per second. Thus, for example, in one situation where the orchard includes sprinklers adjacent each tree and the sprinklers are also operated during frost conditions so that the relative humidity of the air is near 100%, a fog generation system ejecting only about 15 grams per meter of continuous line along the edge of the field per second is sufficient.

In order to get a substantially continuous line of fog generation, nozzles are closely spaced along the length of a pipe suspended high above the ground along the updrift boundary of the area to be protected. Typically, in such a situation the fog nozzles as hereinabove described are spaced an average of only about four inches apart along the pipe. If the nozzles are closer together than about four inches the fog patterns from adjacent nozzles interferes and coalescence of droplets may occur, thereby reducing the efficiency. To get a substantially continuous line of fog generation the nozzles should be no more than about six inches apart on the average, since the total quantity of water flowing through each nozzle is small. In a typical system nozzles with orifices of 0.008 inch operated at 500 psi have an average flow rate of about 2.4 grams per second. In situations where the drift direction of the wind is diagonally across the continuous line instead of normal to it, the effective spacing between the nozzles can be about 6 inches when projected in the wind direction, so that there is an actual spacing of about 8 or 9 inches between adjacent nozzles.

In situations where more fog is needed than can be provided with nozzles about 4 inches apart, additional pipes are desirable rather than crowding the nozzles. Alternatively nozzles can be placed on opposite sides of a pipe for minimizing interference.

FIG. 8 illustrates an arrangement for suspending a continuous line of fog ejecting nozzles along a boundary of an area to be protected. As illustrated in this embodiment a wooden pole 46 is embedded in the ground with the spacing between adjacent poles about 200 feet. The poles are tall enough to reach into a temperature inversion and are typically 40 foot poles. A line of such poles is provided along the entire updrift boundary of the area to be protected. A tension cable 47 is stretched between adjacent poles at their tops and the cables at the ends of the line are suitably anchored for maintaining the poles in a fixed position. It is found important to provide such a tension cable so that maintenance can be conducted on the fog generation system without disturbing th poles.

An underground pipeline 48 extends along the line of poles and riser pipes 49 are connected to it at each pole. Preferably the pipes are all plastic for preventing corrosion. A valve 51 is provided in each of riser pipes for separate control or if desired, in an alternative embodiment, multiple pipelines may be carried underground with connection of one riser to each pipeline so that a single valving at the inlet to the feed pipe is sufficient for control. If automatic control of the system is used it is preferable to have multiple feed pipe lines for separate risers and automatic control only at the source of water. Since control can be effected with one of the lines it may only be necessary to have valves in half of the risers.

A support cable 52 runs over a pulley 53 near the top of the pole and beneath the tension cable 47. The end of the support cable 53 is looped over a hook 54 near ground level. Thus, the support cable extends between two adjacent poles and is hooked near ground level to each of the poles. A number of flexible hangers 56 are connected to the support cable and at their opposite end are looped around a pipe 57. A second pipe 58 is suspended from the first pipe by a plurality of rigid links 59. In a typical embodiment the pipes 57 and 58 are standard ½ inch polyvinyl chloride and the links 59 are about 4 feet apart. This gives some rigidity to the pair of pipes and the hangers 56 can also be 3 or 4 feet apart. When only a single PVC pipe is used beneath the support cable, hangers about 2 feet apart are desirable.

A plurality of nozzles 60 are provided along each of the pipelines. In a preferred arrangement the nozzles on the pipes are about 4 inches apart so that there are six nozzles per foot along the line between the poles. With this close spacing there is a substantially continuous line of fog generation along the edge of the area being protected. Although illustrated as if pointing upwardly and downwardly it is preferable that the nozzles point partly laterally so that the spray patterns do not unduly interfere. Thus, for example, the nozzles on the upper pipe 57 point upwardly at about 45° from horizontal and those on the lower pipe point downwardly at about 45°. The spray patterns from the nozzles are conical and there is no direct impingement. The spray travels only a foot or two before it loses its primary impetus from the nozzle and there after it drifts with the wind. All of the nozzles 60 point generally downwind so the fog does not drift back through the spray pattern of the nozzles.

The upper pipe 57 is connected to one of the risers 49 by a flexible high pressure hose 71. The lower pipe is connected to the other riser by a flexible hose 72. The flexible hoses are used to allow for swaying of the pipes under wind conditions and for thermal expansion and contraction of the PVC pipes extending between the poles. Preferably each of the pipes is about 100 feet long with its far end capped, and thereby extends about half way to the adjacent pole. This is desirable so that the pressure drop in the pipe is within acceptable limits. The riser pipes 49 are somewhat larger in diameter, such as ¾ or 1 inch, and they are connected at their upper ends to another set of nozzle bearing pipes (not shown) extending in the opposite direction from the pipes 57 and 58 illustrated in FIG. 8.

The hose 71 and 72 are connected to the respective risers by couplings 73 so that the pipes can be lowered for maintenance. When inspection or maintenance is desired the couplings 73 are disconnected, a rope is connected to the loop in the end of the support cable 52, and the loop is taken off of the hook 54. This permits the end of the pipes to be lowered to ground level or held at any convenient height above ground level. The same thing is then done at the other end of the support cable at the next adjacent pole and the lowered pipes and nozzles can then be inspected or repaired. Tees 74 are connected to the risers near ground level so that the flexible hoses can be connected for testing nozzles.

When testing or maintenance is completed the end of the support cable is again pulled down and hooked over the hook 54 and the hoses reconnected at the higher elevation. It will be noted that lowering of any individual segment of the pipeline does not affect the balance of the system because of the tension cable 47 which holds the poles in position. It is also unnecessary to work at high elevation or lower the entire system.

Two pipelines along the continuous fog generation line are advantageous since under climatic conditions where it is only necessary to eject relatively small amounts of water into the air to make fog, only one of the pipelines need be activated. Conversely, under conditions where more fog is desired, such as nights with relatively low humidity or higher winds, or during lower temperature when greater inhibition of radiation is desired, both pipelines may be activated for ejecting the maximum possible amount of water.

Several embodiments of environmental control system incorporating principles of this invention have been described and illustrated herein. It will be apparent to one skilled in the art that many modifications and variations can be provided in such systems, such as, for example, the arrangement of means for injecting water droplets into the environment can be widely varied to make the water droplet injection conform to the natural or artificial terrain and the prevailing wind and weather conditions. Likewise, several embodiments of fog producing nozzle for injecting water droplets in the range of from about 5 to 50 microns into the environment have been described and illustrated herein. Many other arrangements for obtaining impact of a high velocity stream on a smooth, solid surface for efficient droplet production will be apparent to one skilled in the art. Because of the many possible modifications and variations, it is to be understood that within the scope of the appended claims the invention may be practiced otherwise than as specifically described.

What is claimed is:

1. A method for protecting an agricultural area from frost damage comprising:
    generating a fog of water droplets substantially continuously along an updrift boundary of the area and at a sufficient elevation above ground level that the temperature with water vapor is higher than the original temperature of air nearer ground level; and
    spraying a substantially continuous curtain of relatively warm water droplets into relatively cool air along an updrift boundary of the area to be protected, said water droplets being sufficiently large that a portion falls to ground level and sufficiently small that a major portion of the water has come into equilibrium with the surrounding air before reaching ground level, said relatively warm droplets being sprayed at an elevation below the elevation of fog generation.

2. A method as defined in claim 1 wherein the step of spraying comprises spraying water droplets having an average diameter in excess of about 100 microns at an elevation of about 15 feet above ground level.

3. A method for protecting an agricultural area from frost damage comprising the steps of:
generating a fog of water droplets substantially continuously along an updrift boundary of the area and at a sufficient elevation above ground level that the temperature of the resultant mixture of fog droplets and air saturated with water vapor is higher than the original temperature of air nearer ground level;
adding heat energy to air moving laterally into the area to be protected near ground level; and
raising the relative humidity of the air to about 100%.

4. A method for protecting an agricultural area from frost damage comprising the steps of:
generating a fog of water droplets substantially continuously along an updrift boundary of the area and high enough in a surface temperature inversion that the temperature at the elevation of fog generation is significantly higher than the temperature at ground level; and
spraying a substantially continuous curtain of relatively warm water droplets into relatively cool air along an updrift boundary of the area to be protected at a lower elevation than generation of fog, said water droplets being sufficiently large that a portion falls to ground level and sufficiently small that a major portion of the water has come to equilibrium with the surrounding air before reaching ground level.

5. A method as defined in claim 4 wherein the step of spraying comprises spraying water droplets having an average diameter in excess of about 100 microns at an elevation of about 15 feet above ground level.

6. A system for protecting an agricultural area from frost damage comprising:
means for supplying water;
means extending substantially continuously along an updrift boundary of the agricultural area for ejecting water in the form of droplets, a major portion of the droplets having diameters in the range of from about 5 to 50 microns and an average diameter in the range of from about 10 to 30 microns;
means for elevating the means for ejecting more than about 25 feet above ground level; and
means for spraying a substantially continuous curtain of relatively warm water droplets into relatively cool air along an updrift boundary of the area to be protected, said water droplets being sufficiently large that a portion falls to ground level and sufficiently small that a major portion of the water has come to equilibrium with the surrounding air before reaching ground level.

7. A system as defined in claim 6 wherein the means for spraying comprises means for spraying water droplets having an average diameter in excess of about 100 microns at an elevation of about 15 feet above ground level.

8. A system for protecting an agricultural area from frost damage comprising:
means for supplying water;
means extending substantially continuously along an updrift boundary of the agricultural area for ejecting water in the form of droplets, a major portion of the droplets having diameters in the range of from about 5 to 50 microns and an average diameter in the range of from about 10 to 30 microns;
means for elevating the means for ejecting more than about 25 feet above ground level;
means for adding heat energy to air moving laterally into the area to be protected near ground level; and
means for raising the relative humidity of the air to about 100%.

9. A system for protecting an agricultural area from frost damage comprising:
means for supplying water;
means adjacent the agricultural area for ejecting water in the form of droplets, a major portion of the droplets having diameters in the range of from about 5 to 50 microns and an average diameter in the range of from about 10 to 30 microns;
means for elevating the means for ejecting more than about 25 feet above ground level comprising:
a row of poles;
a cable interconnecting the poles near their upper ends; and wherein the means for ejecting comprises:
a pipe suspended from the cable;
a plurality of fog generating nozzles along the length of the pipe; and
means for connecting the pipe to the means for supplying water; and
a second cable interconnecting the poles below the first cable and more than about 15 feet above ground level;
a second pipe suspended from the second cable;
means for spraying water droplets having an average diameter of at least about 100 microns along the second pipe.

10. A system as defined in claim 9 further comprising means for heating the water to be sprayed to a temperature substantially above the freezing temperature of water.

11. A system for protecting an agricultural area from frost damage comprising:

means for supplying water;

means extending substantially continuously along an updrift boundary of the agricultural area for ejecting water in the form of droplets, a major portion of the droplets having diameters in the range of from about 5 to 50 microns and an average diameter in the range of from about 10 to 30 microns;

means for elevating the means for ejecting more than about 25 feet above ground level; and means for spraying water droplets at a temperature substantially above freezing along an edge of the agricultural area and at an elevation above ground level of about 15 feet, and wherein the major portion of the droplets have an average diameter in excess of about 100 microns.

12. A system for protecting an agricultural area from frost damage comprising:

means for supplying water;

means extending substantially continuously along an updrift boundary of the agricultural area for ejecting water in the form of droplets, and major portion of the droplets having diameters in the range of about 5 to 50 microns and an average diameter in the range of from about 10 to 30 microns;

means for elevating the means for ejecting high enough in a surface temperature inversion that the temperature at the elevation of the means for ejecting is significantly higher than the temperature at ground level; and means for spraying a substantially continuous curtain of water droplets at a temperature substantially above freezing along an edge of the agricultural area, the water droplets being principally in the size range between a size where a portion of the droplets falls to ground level and a size where a major portion of the water has come to equilibrium with the surrounding air before reaching ground level.

13. In a method for protecting an agricultural area from frost damage including generation of a fog of water droplets, the improvement comprising:

spraying a substantially continuously curtain of relatively warm water droplets into relatively cool air along a boundary of the area to be protected at a lower elevation than generation of fog, said droplets being sufficiently large that a portion falls to ground level and sufficiently small that a major portion of the water has come to equilibrium with the surrounding air before reaching ground level.

14. In a method as defined in claim 13 the further improvement comprising, heating the water to be sprayed to a temperature of at least about 100° F.

15. In a method as defined in claim 13 the further improvement wherein the step of spraying comprises spraying water droplets having an average diameter of at least about 100 microns at an elevation of about 15 feet above ground level.

16. In a system for protecting an agricultural area from frost damage including means for generating a fog of water droplets, the improvement comprising:

means for spraying a substantially continuous curtain of relatively warm water droplets into relatively cool air along a boundary of the area to be protected at a lower elevation than the means for generating fog, said droplets being sufficienty large that a portion falls to ground level and sufficiently small that a major portion of the water has come to equilibrium with the surrounding air before reaching ground level.

17. In a system as defined in claim 16 the further improvement comprising means for heating the water to be sprayed to a temperature of at least about 100° F.

18. In a system as defined in claim 16 the further improvement wherein means for spraying comprises means for spraying water droplets having an average diameter of at least about 100 microns at an elevation of about 15 feet above ground level.

* * * * *